Dec. 25, 1956  A. KUNDERT  2,775,093
DETACHABLE LINK STRAP OF SYNTHETIC PLASTIC MATERIAL
Filed March 30, 1956

*INVENTOR.*
*ALEX KUNDERT*
BY
*Toulmin & Toulmin*
*Attorneys*

United States Patent Office 2,775,093
Patented Dec. 25, 1956

---

2,775,093

DETACHABLE LINK STRAP OF SYNTHETIC PLASTIC MATERIAL

Alex Kundert, Ruschlikon, Switzerland

Application March 30, 1956, Serial No. 575,206

Claims priority, application Switzerland August 25, 1955

4 Claims. (Cl. 59—80)

The subject matter of the present invention is a link strap of synthetic plastic material which is composed of link members of the same or complemental configuration of shape of an elastic synthetic plastic, the said link members having complemental separable fastener elements of stud and socket type including a link-like or loop-like female part and a cup-shaped or male part, the said parts being connected together by, at least, one strip arranged on the back, the male or cup-shaped part having, on its periphery a concave conformation providing an annular groove into which the link-like or open-like female part of an adjoining link member can snap, so that the consecutive link members of the link strap are detachably held together by their interengaging link-like parts and cup-shaped parts.

An example of the link strap of synthetic plastic material according to the invention, an individual link member of the said link strap and three different link members of modifications of the said link strap are represented in the accompanying drawings, of which Fig. 1 is an elevation of a link strap as seen from the back;

Figure 1:
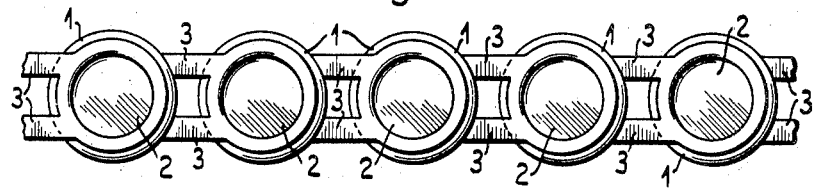
Figure 2:
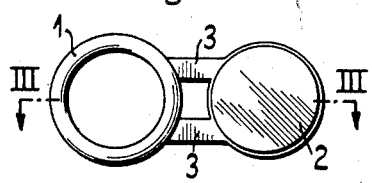
Fig. 2 is an elevation of an individual link member of the said link strap as seen from the front.

The link strap represented in Fig. 1 is composed of link members which consist of flexible synthetic plastic material, for example polyvinyl chloride, polyethylene and ultramide, which possesses a certain elasticity. All the link members of the said link strap are of substantially the same shape and include a link-like, in this case annular or open loop-like female part 1 and a male cup-shaped part 2 which are connected together, at their back, by one or more, thin and therefore flexible strips 3. The male cup-shaped part 2 has, in its periphery a concave conformation providing an annular groove 4 and said part 1 has such a diameter that, by virtue of the elasticity of the synthetic plastic, comprising the link members, it can be forced over the edge of the male or cup-shaped part 2 of another link member and is then held, fully engaged, in the aforementioned concave conformation providing an annular groove 4 of the said other link member. In this way, as many link members as desired can be put together to form a link strap of any desired length.

The link strap can be closed by bringing the annular or open loop-like female part of its last link member into the concave conformation providing the annular groove 4 of the male or cup-shaped part 2 of the first of its link members. Such a closed link strap can be used as a belt or a necklace which can be opened, at any desired position, by pressing the male or cup-shaped part 2 of one of its link members out of the annular open or loop-like female part 1 of the adjacent link member, which is lying in the concave conformation provided by the annular groove 4. When doing this, the pressure should be exerted on the front side of the male or cup-shaped part on the side turned away from the annular or open loop-like female part 1 of this link member. The length of a belt or necklace consisting of such link members can be varied by inserting or removing link members.

Figure 4:
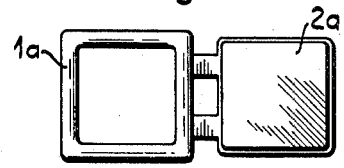
Figs. 4, 5 and 6 are each an elevation of an individual link member of three modifications of the said link strap as seen from the front.
Figure 3:
Fig. 3 is a section on the line III—III of Fig. 2.
Figure 5:
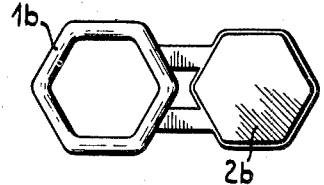
Figure 6:
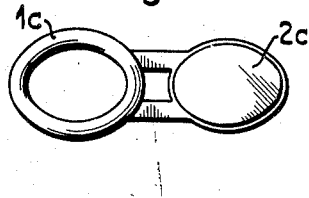

The male or cup-shaped parts 2 of the link members of the link strap shown in Fig. 1 are circular and, accordingly, their annular parts 1 are also circular rings. However, the link members of the link strap may be of other shapes; for example they may have male or cup-shaped parts 2a of square shape and, accordingly, square-shaped link-like parts 1a (Fig. 4), male or cup-shaped parts 2b of hexagonal shape and, accordingly, link-like parts 1b of hexagonal shape (Fig. 5), or male or cup-shaped parts 2c of elliptical shape and, accordingly, link-like parts 1c of elliptical shape (Fig. 6). Instead of two strips 3 that connect the link-like part 1 with the cup-shaped part 2, the link members of the link strap may have only one such strip or more than two strips.

The link members of the link strap may be coloured and the link strap may be composed of link members of the same colour or of link members of different colours.

What I claim is:

1. A flexible link strap comprising a plurality of one-piece substantially planar link members of flexible plastic material, each of said link members being provided with separable fastener elements consisting of a male member and an open loop-like female member serving when the dissimilar fastener elements of adjacent successive link members are engaged to provide connections between said link members linearly of the strap, the cooperating fastener elements of adjacent link members including complemental concave and convex peripheral mating surfaces on said male and female members respectively, and the said concave peripheral surface of said male member having a terminal lip of greater transverse dimension than the transverse dimension of the convex peripheral surface of the said female member, whereby said elements are capable of cooperative mating snap engagement and disengagement.

2. A flexible link strap, comprising a plurality of one-piece substantially planar link members of flexible plastic material, each of said link members being provided with separable fastener elements comprising at least one male member and at least one open loop-like female member serving when the dissimilar fastener elements of adjacent successive link members are engaged to provide connections between said link members linearly of the strap, the cooperating fastener elements of adjacent link members including complemental concave and convex peripheral mating surfaces on said male and female members respectively, and the said concave peripheral surface of said male member having a terminal lip of greater transverse dimension than the transverse dimension of the convex peripheral surface of the said female member, whereby said elements are capable of cooperative mating snap engagement and disengagement.

3. A flexible link strap, comprising a plurality of one-piece substantially planar link members of flexible plastic material, each of said link members being provided with separable fastener elements comprising a male member and an open loop-like female member serving when the dissimilar fastener elements of adjacent successive link members are engaged to provide connections between said link members linearly of the strap, the cooperating fastener elements of adjacent link members including complemental concave and convex peripheral mating surfaces, the said concave peripheral surface of one of said elements having a terminal lip, the transverse dimension of said lip and the transverse dimension of the convex peripheral surface of the other said element being relatively so proportioned that said lip must yieldably pass over said convex peripheral surface, whereby said elements are capable of cooperative mating snap engagement and disengagement.

4. A flexible link strap, comprising a plurality of one-piece substantially planar link members of flexible plastic material, said link members being provided with complemental separable fastener elements of stud and socket type, the socket elements thereof being of open loop form, said complemental fastener elements serving when adjacent successive link members are engaged therethrough to provide connections between the link members linearly of the strap, the cooperating fastener elements of adjacent link members including complemental concave and convex peripheral mating surfaces, the said concave peripheral surface of one of said elements having a terminal lip, the transverse dimension of said lip and the transverse dimension of the convex peripheral surface of the other said element being relatively so proportioned that said lip must yieldably pass over said convex peripheral surface, whereby said elements are capable of cooperative mating snap engagement and disengagement.

References Cited in the file of this patent
UNITED STATES PATENTS

| | | |
|---|---|---|
| 2,119,921 | Levy | June 7, 1938 |
| 2,461,703 | Spanel | Feb. 15, 1949 |
| 2,625,306 | Murphy | Jan. 13, 1953 |
| 2,714,269 | Charles | Aug. 2, 1955 |